US012699808B2

(12) United States Patent
Matsutani et al.

(10) Patent No.: US 12,699,808 B2
(45) Date of Patent: Aug. 4, 2026

(54) INFORMATION PROCESSING DEVICE

(71) Applicant: TOYOTA JIDOSHA KABUSHIKI KAISHA, Toyota (JP)

(72) Inventors: Shintaro Matsutani, Kariya (JP); Ryuichi Danno, Kasugai (JP); Atsushi Ikegaya, Aisai (JP); Masashi Nomoto, Tokyo (JP); Oral Kaplan, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 18/680,393

(22) Filed: May 31, 2024

(65) Prior Publication Data

US 2024/0427932 A1 Dec. 26, 2024

(30) Foreign Application Priority Data

Jun. 26, 2023 (JP) ................................. 2023-104053

(51) Int. Cl.
| | |
|---|---|
| G06F 21/00 | (2013.01) |
| G06F 21/62 | (2013.01) |
| G07C 5/00 | (2006.01) |

(52) U.S. Cl.
CPC ......... G06F 21/6254 (2013.01); G07C 5/008 (2013.01)

(58) Field of Classification Search
CPC ............... G06F 21/6254; G06F 21/604; G06F 21/6245; G06F 2221/2137; G06F 2221/2141; G07C 5/008; H04L 67/12; H04L 67/53
See application file for complete search history.

(56) References Cited

U.S. PATENT DOCUMENTS

| | | | | |
|---|---|---|---|---|
| 2008/0136670 | A1* | 6/2008 | Tengler | G08G 1/20 |
| | | | | 340/901 |
| 2018/0286142 | A1* | 10/2018 | Pakki | B64D 45/00 |
| 2023/0100739 | A1* | 3/2023 | Doerne | G08G 1/166 |
| | | | | 315/82 |
| 2023/0107465 | A1* | 4/2023 | Sakai | G07C 5/0866 |
| | | | | 348/148 |
| 2023/0139933 | A1* | 5/2023 | Tam | B60W 60/0053 |
| | | | | 701/26 |

FOREIGN PATENT DOCUMENTS

| | | |
|---|---|---|
| JP | 2014-241098 A | 12/2014 |
| JP | 2022-163020 A | 10/2022 |

OTHER PUBLICATIONS

Hoh et al., "Enhancing Privacy and Accuracy in Probe Vehicle-Based Traffic Monitoring via Virtual Trip Lines", IEEE Transactions on Mobile Computing, vol. 11, No. 5, May 2012.*
Hoh et al., "Virtual trip lines for distributed privacy-preserving traffic monitoring", MobiSys '08: Proceedings of the 6th international conference on Mobile systems, applications, and services, pp. 15-28 (Year: 2008).*

* cited by examiner

*Primary Examiner* — Morshed Mehedi
(74) *Attorney, Agent, or Firm* — Oliff PLC

(57) ABSTRACT

An information processing device receives first data related to travel from a vehicle. The information processing device acquires a predetermined condition that is set by the user and indicates a range of the first data that is permitted to be provided to a third party or a range of the first data that is not permitted to be provided to a third party. Then, the information processing device sends, to the third party server, the data permitted to be provided to the third party extracted based on the predetermined condition among the first data.

2 Claims, 5 Drawing Sheets

FIG. 2

TRAVEL DATA

| VEHICLE ID | DATE AND TIME | POSITION | SPEED | ACCELERATION | ... |
|---|---|---|---|---|---|
| V001 | ... | ... | ... | ... | ... |

FIG. 3

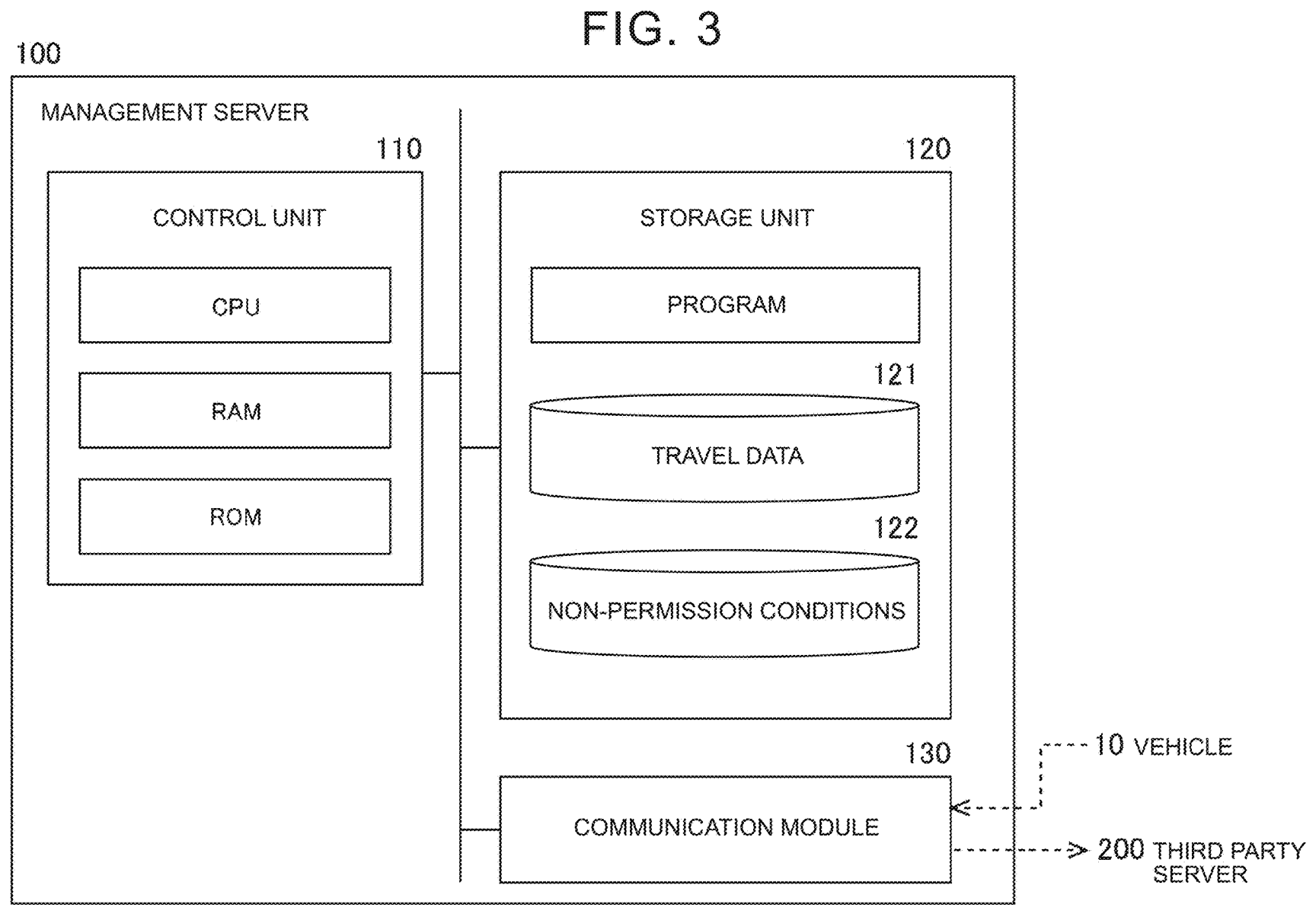

100 MANAGEMENT SERVER

110 CONTROL UNIT
- CPU
- RAM
- ROM

120 STORAGE UNIT
- PROGRAM 121
- TRAVEL DATA 122
- NON-PERMISSION CONDITIONS

130 COMMUNICATION MODULE

10 VEHICLE

200 THIRD PARTY SERVER

NON-PERMISSION CONDITION DATABASE

| USER ID | VEHICLE ID | NON-PERMISSION CONDITIONS |
|---------|------------|---------------------------|
| U001 | V001 | . . . |
| ⋮ | ⋮ | ⋮ |

START

ACQUIRE
NON-PERMISSION CONDITIONS          S101

EXTRACT PERMITTED DATA          S102

SEND PERMITTED DATA          S103

END

INFORMATION PROCESSING DEVICE

CROSS-REFERENCE TO RELATED APPLICATION

This application claims priority to Japanese Patent Application No. 2023-104053 filed on Jun. 26, 2023, incorporated herein by reference in its entirety.

BACKGROUND

1. Technical Field

The present disclosure relates to information processing devices that collect data related to travel of a vehicle.

2. Description of Related Art

Japanese Unexamined Patent Application Publication No. 2014-241098 (JP 2014-241098 A) discloses a sensor data management system. In the sensor data management system disclosed in JP 2014-241098 A, a server that manages sensor data performs an anonymization process for individually anonymizing designated data items of the sensor data under designated conditions according to the definition of an anonymization policy settings file. A combination of desired data items of the sensor data including the anonymized sensor data generated by the anonymization process is sent to another server.

SUMMARY

It is an object of the present disclosure to make it possible to provide data related to travel of a vehicle to a third party according to the intention of a user associated with the vehicle.

An information processing device according to the present disclosure includes a control unit configured to receive first data related to travel from a vehicle, acquire a predetermined condition set by a user associated with the vehicle, the predetermined condition indicating a range of the first data permitted to be provided to a third party or a range of the first data not permitted to be provided to the third party, and send, to a third party server, data permitted to be provided to the third party, the data being extracted from the first data based on the predetermined condition.

According to the present disclosure, it is possible to provide data related to travel of a vehicle to a third party according to the intention of a user associated with the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram illustrating an example of a table configuration of travel data transmitted from a vehicle to a management server;

FIG. 3 is a block diagram schematically illustrating a configuration of a management server;

DETAILED DESCRIPTION OF EMBODIMENTS

Figure 1:
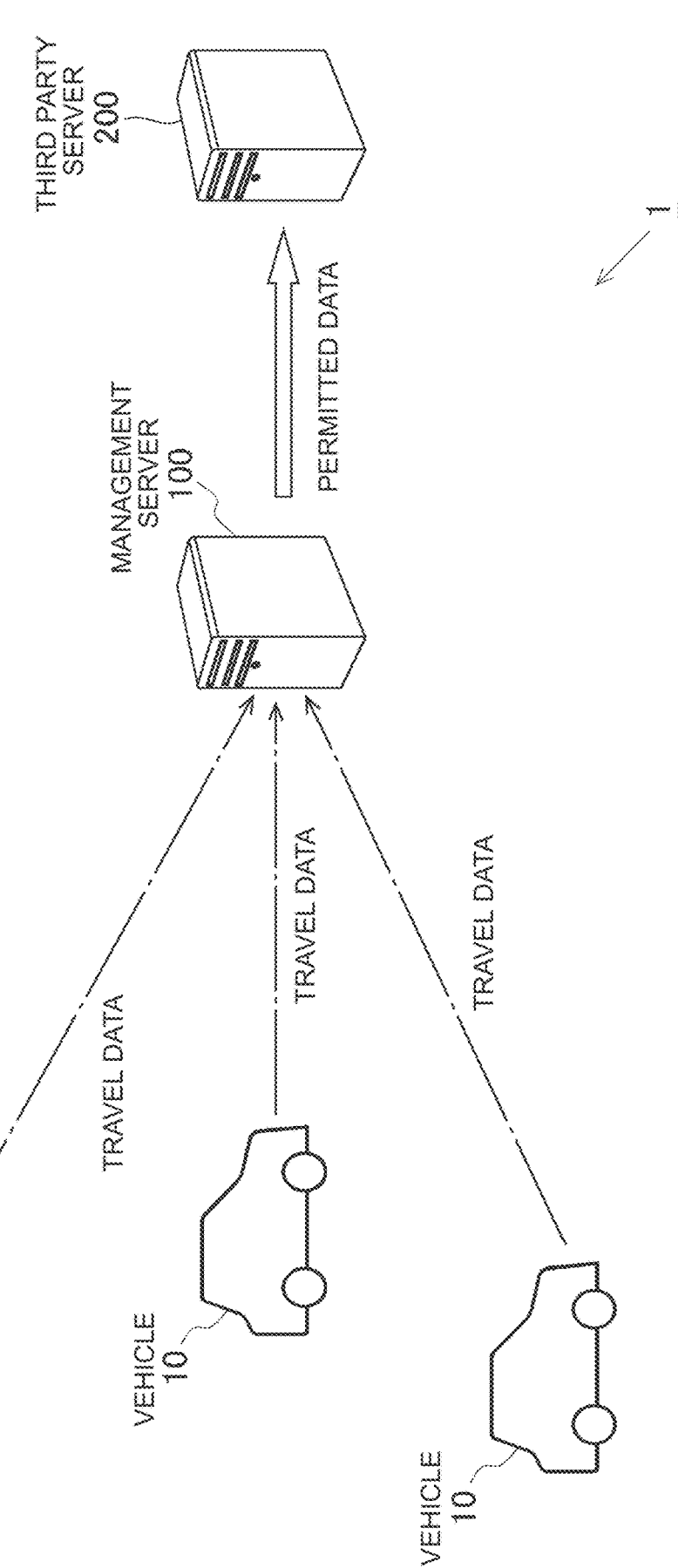
FIG. 1 is a diagram illustrating a flow of data in a data providing system according to an embodiment.

In recent years, efforts have been made to collect traveling data (hereinafter, sometimes referred to as "traveling data") from many vehicles and utilize the collected traveling data as big data. However, the user associated with each vehicle may not be allowed to provide all travel data as big data. That is, the user associated with the vehicle may not allow the provision of at least some of the traveling data to a third party. Here, the third party is a person who utilizes the collected traveling data as big data. Therefore, the present disclosure provides a technique for providing travel data to a third party in accordance with an intention of a user related to a vehicle.

An information processing device according to the present disclosure includes a control unit. The control unit receives first data from the vehicle. The first data is travel data. The first data may be acquired during traveling of the vehicle by various sensors mounted on the vehicle. The control unit acquires a predetermined condition set by a user related to the vehicle. The predetermined condition indicates a range of the first data permitted to be provided to the third party by the user or a range of the first data permitted to be provided to the third party by the user. The user can set predetermined conditions at an arbitrary timing. Note that the control unit may receive a predetermined condition from a terminal (for example, an in-vehicle terminal mounted in a vehicle) to which a user has input a predetermined condition.

Further, the control unit extracts, from the first data received from the vehicle, data permitted to be provided to a third party by the user (hereinafter, sometimes referred to as "permitted data") based on a predetermined condition. At this time, if the predetermined condition indicates the range of the first data permitted by the user to be provided to the third party, the control unit extracts data satisfying the predetermined condition from the first data as permitted data. On the other hand, if the predetermined condition indicates the range of the first data that is not permitted by the user to be provided to the third party, the control unit extracts, as the permitted data, data obtained by excluding the data satisfying the predetermined condition from the first data.

Then, the control unit transmits the extracted permission data to the third party server. The third party server is a server device related to a third party that utilizes travel data as big data. Note that the control unit may transmit the first data received from the vehicle to the third party server in a state where some processing is performed instead of the state as it is.

According to the present disclosure, it is possible to extract permission data corresponding to a user's intention from the first data received from the vehicle and provide the extracted permission data to a third party.

Hereinafter, an embodiment of the present disclosure will be described with reference to the drawings. Dimensions, materials, shapes, relative arrangements, and the like of the components described in the present embodiment are not intended to limit the technical scope of the present disclosure only thereto unless otherwise specified.

Embodiment

System Overview

FIG. 1 is a diagram illustrating a flow of data in a data providing system according to the present embodiment. The data providing system 1 is a system for collecting travel data from a plurality of vehicles 10 and providing the collected travel data to a third party. The data providing system 1 includes a plurality of vehicles 10, a management server 100, and a third party server 200. The management server 100 is a server device that collects traveling data from a plurality of vehicles 10. The third party server 200 is a server device related to a third party that uses travel data of the vehicle 10 as big data. In the present embodiment, the management server 100 corresponds to an "information processing device" according to the present disclosure.

The plurality of vehicles 10, the management server 100, and the third party server 200 are connected to each other via a network. Here, as the network, for example, a Wide Area Network (WAN) which is a public communication network such as the Internet or a telephone communication network such as a mobile telephone may be adopted. The network may also include telephone communication networks for cellular phones and the like, and wireless communication networks such as Wi-Fi (registered trademark).

Each vehicle 10 includes various sensors for acquiring travel data. Then, each vehicle 10 transmits the travel data acquired during the travel to the management server 100 at a predetermined timing. For example, each vehicle 10 may periodically transmit travel data to the management server 100 at predetermined intervals during travel.

FIG. 2 is a diagram illustrating an example of a table configuration of travel data transmitted from each vehicle 10 to the management server 100. As shown in FIG. 2, the travel data includes vehicle ID fields, datetime fields, position fields, velocity fields, and acceleration fields. In the vehicle ID field, a vehicle ID that is identification information for identifying the vehicle 10 that is the source of the traveling data is inputted. In the date and time field, information about the date and time when the travel data is acquired in the vehicle 10 is input. The position information of the vehicle 10 is input to the position field. In the speed field, speed information of the vehicle 10 is input. The acceleration information of the vehicle 10 is input to the acceleration field. In addition, ON and OFF of the start button (or the ignition switch) of the vehicle 10 may be determined. Further, the traveling data may include image information captured by a camera mounted on the vehicle 10. The traveling data does not necessarily have to be data acquired by a sensor mounted on the vehicle 10. In the present embodiment, the traveling data corresponds to "first data" according to the present disclosure.

The management server 100 transmits the traveling data of the vehicle 10 to the third party server 200 in response to a request from a third party. As a result, the third party can receive the travel data to be used as the big data. However, the user of each vehicle 10 may not be allowed to provide all of the traveling data of the vehicle 10 transmitted to the management server 100 to a third party. Here, the user of the vehicle 10 is, for example, a driver of the vehicle 10 or an owner of the vehicle 10. Therefore, in the present embodiment, the non-permission condition is set in advance by the user of each vehicle 10. The non-permission condition is a condition indicating a range of travel data that is not permitted to be provided to a third party by the user. The non-permission condition is defined by, for example, a travel date and time of the vehicle 10, a travel area of the vehicle 10, or a departure point, an arrival point, or a waypoint in a traveling route of the vehicle 10. In the present embodiment, the non-permission condition corresponds to a "predetermined condition" according to the present disclosure.

The management server 100 stores a non-permission condition set by each user. Then, data obtained by excluding data satisfying the non-permission condition from the traveling data received from the vehicle 10 is extracted as permission data. Then, the management server 100 transmits the permission data to the third party server.

Configuration of Management Server

Next, the configuration of the management server 100 will be described. FIG. 3 is a block diagram schematically illustrating a configuration of the management server 100. The management server 100 includes a control unit 110, a storage unit 120, and a communication module 130. The control unit 110 has a function of performing arithmetic processing for controlling the management server 100. The control unit 110 includes a processor such as a central processing unit (CPU), a main storage device such as a random-access memory (RAM), and a secondary storage device such as a read-only memory (ROM). CPU is an exemplary processor resource. In addition, RAM and ROM are exemplary memory-resources. The control unit 110 can execute arbitrary information processing based on various programs and various data. However, some or all of the functions of the control unit 110 may be realized by a hardware-circuit such as an ASIC, FPGA.

The storage unit 120 is constituted by any storage device such as a RAM, ROM, a hard disk drive, or a flash memory. The storage unit 120 may include a removable medium (portable recording medium). Here, the removable medium is, for example, a USB memory, a SD card, or a disc recording medium such as a CD-ROM, DVD disc or a Blu-ray disc. The storage unit 120 stores programs to be executed by the control unit 110 and various types of data to be used for executing the programs.

In the storage unit 120, a database for storing travel data 121 received from each vehicle 10 is constructed. In this database, travel data 121 is stored for each vehicle 10. Further, in the storage unit 120, a database (non-permission condition database) that stores the non-permission condition 122 set by the user of each vehicle 10 is constructed.

Figures 4, 5:
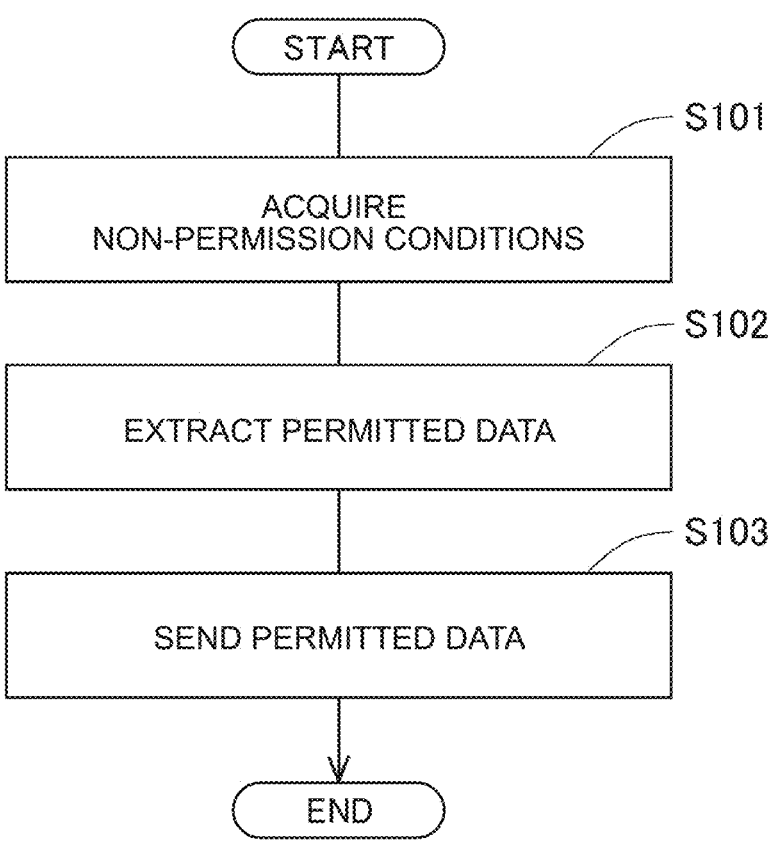
FIG. 4 is a diagram illustrating an example of a table configuration of a non-permission condition database.
FIG. 5 is a flow chart showing a flow of information processing executed by the control unit when data is transmitted from the management server to the third party server.

FIG. 4 is a diagram illustrating an example of a table configuration of a non-permission condition database. As shown in FIG. 4, the disallowed condition data base includes a user ID field, a vehicle ID field, and a disallowed condition field. In the user ID field, a user ID that is an identification information for identifying a user is inputted. In the vehicle ID field, a vehicle ID that is identification information for identifying the vehicle 10 corresponding to the user is inputted. In the non-permission condition field, a non-permission condition set by the user is input.

Here, in a case where (1) the non-permission condition is defined by the travel date and time of the vehicle 10, information on a period (hereinafter, sometimes referred to as a "non-permission period") during which the user is not permitted to provide the travel data to a third party is input in the non-permission condition field. In this case, the provision of the traveling data acquired in the vehicle 10 to a third party during the non-permission period input in the non-permission condition field is prohibited. (2) In a case where the non-permission condition is defined by the travel area of the vehicle 10, information on a region where the user is not permitted to provide the traveling data to a third party (hereinafter, may be referred to as a "non-permission region") is input in the non-permission condition field. In this case, the provision of the traveling data acquired in the vehicle 10 traveling in the non-permitted area input in the non-permitted condition field to a third party is prohibited.

In addition, (3) in a case where the non-permission condition is defined by a departure point, an arrival point, or a waypoint in a traveling route of the vehicle 10, information on a traveling route (hereinafter, sometimes referred to as "non-permission route") in which the user disallows the provision of the traveling data to a third party is input in the non-permission condition field. For example, if the user sets the non-permission condition as the departure point, the departure point is input as the non-permission route in the non-permission condition field. In this case, the provision of the traveling data acquired by the vehicle 10 to a third party during the traveling of the vehicle 10 departing from the departure point input in the non-permission condition field is prohibited. If the user sets the unauthorized condition as the arrival point, the arrival point is input as an unauthorized route in the unauthorized condition field. In this case, the provision of the traveling data acquired by the vehicle 10 to a third party during the traveling of the vehicle 10 that has arrived at the arrival point input in the non-permission condition field is prohibited. Further, if the user sets the non-permission condition as the route, the route is input as the non-permission route in the non-permission condition field. In this case, the provision of the traveling data acquired by the vehicle 10 to a third party during the traveling of the vehicle 10 via the waypoint input in the non-permission condition field is prohibited.

It should be noted that the departure point, the arrival point, or the passing point in the traveling route of the vehicle 10 can be specified based on information on ON and OFF of the start button (or the ignition switch) included in the traveling data. Then, a traveling route from one starting point (a point at which the start button or the ignition switch is turned ON) to one arriving point (a point at which the start button or the ignition switch is turned OFF) can be defined as one traveling route (so-called one trip).

In addition, each user may input a disapproval condition to a user terminal associated with the user. Then, the management server 100 may receive information on the non-permission condition of each user from the user terminal of each user. In this case, the management server 100 stores information on the non-permission condition received from each user terminal in the non-permission condition database.

The communication module 130 is a communication interface for connecting the management server 100 to a network. The communication module 130 is, for example, a Local Area Network (LAN) interface board or wireless communication circuitry for wireless communication. However, the management server 100 may not be necessarily realized by a single physical configuration, and may be configured by a plurality of computers that cooperates with each other.

Flow of Information Processing

Next, a flow of information processing executed by the management server 100 will be described with reference to FIG. 5. FIG. 5 is a flowchart illustrating a flow of information processing executed by the control unit 110 when data is transmitted from the management server 100 to the third party server 200. Note that this flow is executed in a state where the travel data 121 related to the vehicle 10 (hereinafter, sometimes referred to as "target vehicle") that is the target of data transmission is stored in a database constructed in the storage unit 120. In addition, when a data provision request is received from the third party server 200, the control unit 110 may execute this flow. In addition, the control unit 110 may execute this flow every predetermined period.

First, in S101, the non-permission condition 122 set by the user of the target vehicle is acquired from the non-permission condition data base. That is, the non-permission condition 122 corresponding to the vehicle ID of the target vehicle is acquired from the non-permission condition data base. Next, in S102, permission data is extracted from the travel data 121 related to the target vehicles. That is, from the travel data 121 related to the target vehicles stored in the data base of the storage unit 120, the data excluding the data satisfying the non-permission condition acquired by S101 is extracted. Next, in S103, the permission data regarding the target vehicles extracted by S102 is transmitted to the third party server 200. At this time, the control unit 110 may perform processing according to a request from a third party on the travel data 121 stored in the database of the storage unit 120, and then transmit the permission data to the third party server 200.

According to the flow as described above, it is possible to restrict the traveling data that the user of the target vehicle does not allow the provision to the third party from being transmitted from the management server 100 to the third party server 200. That is, the traveling data of the target vehicle can be provided to the third party in accordance with the intention of the user of the target vehicle.

In the present embodiment, the permission condition may be set in advance in place of the non-permission condition by the user of each vehicle 10. The permission condition is a condition indicating a range of travel data permitted by the user to be provided to a third party. The permission condition is also defined by, for example, a travel date and time of the vehicle 10, a travel area of the vehicle 10, or a departure point, an arrival point, or a waypoint in a travel route of the vehicle. In this case, a database (permission condition database) that stores permission conditions set by the user of each vehicle 10 is constructed in the storage unit 120 of the management server 100. Then, the control unit 110 of the management server 100 extracts, as the permission data, only data satisfying the permission condition from the travel data 121 related to the target vehicle stored in the database constructed in the storage unit 120. Further, the control unit 110 transmits the extracted permission data regarding the target vehicle to the third party server 200. In this case, the permission condition corresponds to the "predetermined condition" according to the present disclosure.

Modified Examples

Figure 6:
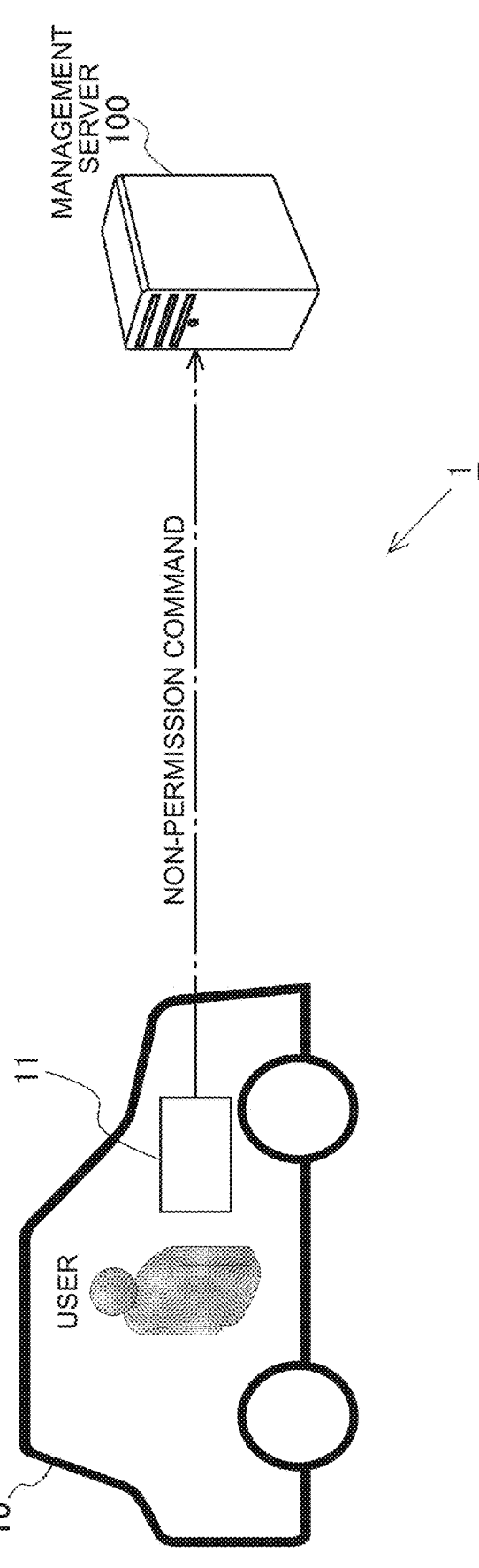
FIG. 6 is a diagram illustrating a flow of data in a data providing system according to a modification.

A modified example of the present embodiment will be described hereinbelow. FIG. 6 is a diagram illustrating a flow of data different from the above-described embodiment in the data providing system 1. In the present modification, the vehicle 10 is equipped with the in-vehicle terminal 11. The in-vehicle terminal 11 is a terminal capable of performing an input operation by a user who is riding on the vehicle 10. The in-vehicle terminal 11 is a computer including a processor such as a CPU, a RAM, ROM, a hard disk drive, a storage device such as a flash memory, and a communication module. The in-vehicle terminal 11 is connected to the management server 100 by a network. Also in the present modification, the travel data of the vehicle 10 is transmitted to the management server 100 as in the above-described embodiment.

In the present modification, a user who is riding on the vehicle 10 inputs a non-permission condition to the in-vehicle terminal 11. At this time, in a case where the user does not allow the third party to provide the travel data between the start point and the end point of the current travel of the vehicle 10, the user inputs the fact to the in-vehicle terminal 11 as the non-permission condition. Note that the user may operate the in-vehicle terminal 11 at this time, for example, at a timing when a start button (or an ignition switch) of the vehicle 10 is turned ON. That is, the input operation to the in-vehicle terminal 11 by the user may be executed at the start point of the current travel of the vehicle 10. Further, the user may operate the in-vehicle terminal 11 at a timing when a start button (or an ignition switch) of the vehicle 10 is turned OFF, for example. That is, the input operation to the in-vehicle terminal 11 by the user may be executed at the end point of the current travel of the vehicle 10. In addition, an image for the user to select whether or not to disallow the provision of the travel data from the start point to the end point of the current travel of the vehicle 10 to the third party may be displayed on the in-vehicle terminal 11.

When the user inputs to the in-vehicle terminal 11 that it is not permitted to provide the traveling data from the start point to the end point of the current travel of the vehicle 10 to the third party, the in-vehicle terminal 11 transmits a non-permission command to the management server 100. The non-permission command is a command to prohibit transmission of travel data from the start point to the end point of the current travel of the vehicle 10 to the third party server 200. The non-permission command transmitted from the in-vehicle terminal 11 to the management server 100 includes the user ID of the user and the vehicle ID of the vehicle 10.

When the management server 100 receives the non-permission command from the vehicle 10, it inputs into the non-permission condition database that it is not permitted to transmit the travel data from the start point to the end point of the current travel of the vehicle 10 to the third party server 200. Accordingly, a non-permission condition for disallowing transmission of the travel data acquired by the vehicle 10 to the third party server 200 between the departure point and the arrival point of the current travel route of the vehicle 10 is input to the non-permission condition database.

Note that it may be input to the in-vehicle terminal 11 that the user who is riding on the vehicle 10 is permitted to provide the travel data from the start point to the end point of the current travel of the vehicle 10 to the third party. In this case, the permission command is transmitted from the in-vehicle terminal 11 to the management server 100. The permission command is a command to permit transmission of travel data between the start point and the end point of the current travel of the vehicle 10 to the third party server 200. Then, in the management server 100, a permission condition for permitting transmission of the travel data acquired by the vehicle 10 to the third party server 200 between the departure point and the arrival point of the current travel route of the vehicle 10 is input to the permission condition database.

According to the present modification, the user of the vehicle 10 can set whether or not to permit the third party to provide the travel data in the travel for each travel (every trip) of the vehicle 10.

Other Embodiments

The above-described embodiments are merely examples, and the present disclosure may be appropriately modified and implemented without departing from the scope thereof.

For example, the processes and means described in the present disclosure can be free combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc read-only memory (CD-ROM), digital versatile disc (DVD), Blu-ray disc, etc.), a read-only memory (ROM), a random-access memory (RAM), an erasable programmable read-only memory (EPROM), an electrically erasable programmable read only memory (EEPROM), a magnetic card, a flash memory, or any type of medium suitable for storing electronic commands such as an optical card.

What is claimed is:

1. An information processing device comprising:
at least one processor implemented with hardware that is programmed to:
 receive first data related to travel from a vehicle,
 acquire a predetermined condition set by a user associated with the vehicle, the predetermined condition indicating a range of the first data permitted to be provided to a third party or a range of the first data not permitted to be provided to the third party, and
 send, to a third party server, data permitted to be provided to the third party, the data being extracted from the first data based on the predetermined condition,
 wherein the predetermined condition is input to an in-vehicle terminal of the vechicle by the user riding in the vehicle,
 the predetermined condition includes at least one of a travel date and time, a travel area, and a waypoint selected and input by the user, and
 the predetermined condition indicates that the first data acquired between a start point of current travel of the vehicle and an end point of the current travel of the vehicle in which the user is riding, with respect to information corresponding to the selected predetermined condition, is or is not permitted to be provided to the third party.

2. The information processing device according to claim 1, wherein the predetermined condition is defined by a departure point or an arrival point, in a travel route of the vehicle.

* * * * *